(12) United States Patent
Eichenberger et al.

(10) Patent No.: US 7,395,531 B2
(45) Date of Patent: Jul. 1, 2008

(54) FRAMEWORK FOR EFFICIENT CODE GENERATION USING LOOP PEELING FOR SIMD LOOP CODE WITH MULTIPLE MISALIGNED STATEMENTS

(75) Inventors: Alexandre E. Eichenberger, Chappaqua, NY (US); Kai-Ting Amy Wang, North York (CA); Peng Wu, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 10/918,879

(22) Filed: Aug. 16, 2004

(65) Prior Publication Data

US 2005/0283773 A1 Dec. 22, 2005

Related U.S. Application Data

(63) Continuation-in-part of application No. 10/862,483, filed on Jun. 7, 2004, now Pat. No. 7,386,842.

(51) Int. Cl.
G06F 9/45 (2006.01)
G06F 15/00 (2006.01)

(52) U.S. Cl. ........................ 717/160; 717/150; 717/151; 717/159; 717/161; 712/22; 712/241

(58) Field of Classification Search ......... 717/149–151, 717/159, 160, 161; 712/2, 7, 10, 16, 20–22, 712/241

See application file for complete search history.

(56) References Cited

U.S. PATENT DOCUMENTS

| | | | |
|---|---|---|---|
| 4,710,872 A | 12/1987 | Scarborough | 717/160 |
| 5,247,645 A | 9/1993 | Mirza et al. | 711/5 |
| 5,349,665 A | 9/1994 | Endo | 717/160 |
| 5,440,687 A | 8/1995 | Coleman et al. | 709/236 |
| 5,481,746 A | 1/1996 | Schiffleger et al. | 712/7 |
| 5,522,074 A | 5/1996 | Endo | 717/150 |
| 5,802,375 A | 9/1998 | Ngo et al. | 717/160 |

(Continued)

OTHER PUBLICATIONS

Lee et al., "Simple Vector Microprocessors for Multimedia Applications," *Preceedings of the 31st Annual International Symposium on Microarchitecture*, Dec. 1998 (12 pages).

(Continued)

*Primary Examiner*—Lewis A. Bullock, Jr.
*Assistant Examiner*—Jue Wang
(74) *Attorney, Agent, or Firm*—VanLeeuwen & VanLeeuwen; D'Ann N. Rifai

(57) ABSTRACT

A system and method is provided for vectorizing misaligned references in compiled code for SIMD architectures that support only aligned loads and stores. In this framework, a loop is first simdized as if the memory unit imposes no alignment constraints. The compiler then inserts data reorganization operations to satisfy the actual alignment requirements of the hardware. Finally, the code generation algorithm generates SIMD codes based on the data reorganization graph, addressing realistic issues such as runtime alignments, unknown loop bounds, residual iteration counts, and multiple statements with arbitrary alignment combinations. Loop peeling is used to reduce the computational overhead associated with misaligned data. A loop prologue and epilogue are peeled from individual iterations in the simdized loop, and vector-splicing instructions are applied to the peeled iterations, while the steady-state loop body incurs no additional computational overhead.

8 Claims, 14 Drawing Sheets

U.S. PATENT DOCUMENTS

| | | | | |
|---|---|---|---|---|
| 5,933,650 | A | 8/1999 | van Hook et al. | 712/2 |
| 5,996,057 | A | 11/1999 | Scales, III et al. | 712/5 |
| 6,113,650 | A | 9/2000 | Sakai | 717/160 |
| 6,202,141 | B1 | 3/2001 | Diefendorff et al. | 712/9 |
| 6,266,758 | B1 * | 7/2001 | van Hook et al. | 712/2 |
| 6,334,176 | B1 | 12/2001 | Scales, III et al. | 712/4 |
| 6,484,255 | B1 | 11/2002 | Dulong | 712/224 |
| 6,550,059 | B1 | 4/2003 | Choe et al. | 717/159 |
| 7,020,873 | B2 | 3/2006 | Bik et al. | 717/156 |
| 7,168,069 | B1 | 1/2007 | Sigmund | 717/140 |
| 7,219,212 | B1 * | 5/2007 | Sanghavi et al. | 712/6 |
| 7,275,147 | B2 | 9/2007 | Tavares | 712/224 |
| 2003/0120889 | A1 | 6/2003 | Roussel et al. | 711/201 |
| 2003/0167460 | A1 | 9/2003 | Desai et al. | 717/151 |
| 2003/0204840 | A1 | 10/2003 | Wu | 717/158 |
| 2004/0001066 | A1 | 1/2004 | Bik et al. | 345/505 |
| 2004/0003381 | A1 | 1/2004 | Suzuki et al. | 717/150 |
| 2004/0006667 | A1 | 1/2004 | Bik et al. | 711/100 |
| 2004/0025150 | A1 | 2/2004 | Heishi et al. | 717/154 |
| 2004/0098709 | A1 | 5/2004 | Kyo | 717/140 |
| 2005/0097301 | A1 * | 5/2005 | Ben-David et al. | 712/22 |
| 2005/0289529 | A1 | 12/2005 | Almog et al. | 717/158 |

OTHER PUBLICATIONS

Cheong et al., "An Optimizer for Multimedia Instruction Sets," Stanford University, Aug. 14, 1997.

Krall et al., "Compilation Techniques for Multimedia Processors," 14 pages.

Sreraman et al., "A Vectorizing Compiler for Multimedia Extensions," *International Journal of Parallel Programming*, 2000 (40 pages).

Bik et al., "Automatic Intra-Register Vectorizatoin for the Intel Architecture," *International Journal of Parallel Programming*, vol. 30, No. 2, Apr. 2002 (p. 65-98).

O'Brien, "Predictive Commoning: A method of optimizing loops containing references to consecutive array elements," 12 pages.

Larsen et al., "Increasing and Detecting Memory Address Congruence," *Proceedings of 11th International Conference on Parallel Architectures and Compilation Techniques*, Sep. 2002, 11 pages.

Naishlos, "Vectorizing for a SIMdD DSP Architecture," Cases '03, Oct. 30-Nov. 1, 2003, *ACM*, pp. 2-11.

Shin et al., "Compiler-Controlled Caching in Superword Register Files for Multimedia Extension Architectures," 11 pages.

Ren et al., "A Preliminary Study on the Vectorization of Multimedia Applications for Multimedia Extensions," 15 pages.

Eichenberger et al., Vectorization for SIMD Architectures with Alignment Constraints, *PLDI'04*, Jun. 9-11, 2004, p. 82-93.

Chatterjee et al., "Modeling Data-Parallel Programs with the Alignment-Distribution Graph," *6th Annual Workshop on Languages and Compilers for Parallelism*, Aug. 1993, 28 pages.

Allen et al., "Automatic Translation of Fortran Programs to Vector Form," *ACM Transactions on Programming Languages and Systems*, v. 9, No. 4, Oct. 1987, p. 491-542.

*AltiVec™ Technology Programming Interface Manuel*, 1999, 262 pages.

Arafeh et al., "Vectorization and Parallelization Interactive Assistant," 1988, ACM 0-89791-260-8/88/0002/0573, pp. 573-577.

McKenney et al., "Generating Parallel Code for SIMD Machines," ACM Letters on Programming Languages and Systems, vol. 1, No. 1, Jan. 1992, pp. 59-73.

Pajuelo et al., "Speculative Dynamic Vectorization," 2002, IEEE 1063-6897/02, pp. 271-280.

Naishlos et al., "Vectorizing for a SIMdD DSP Architecture," CASES '03, Oct. 30-Nov. 1, 2003, ACM 1-58113-676-5/03/0010, pp. 2-11.

Scarborough et al., "A Vectorizing Fortran Compiler," Mar. 1986, IBM Journal of Research and Development, vol. 30, Issue 2, pp. 163-171.

Levine et al., "A Comparative Study of Automatic Vectorizing Compilers," 1991, Parallel Computing, vol. 17.

Cukic et al., "Automatic Array Alignment as a Step in Hierarchical Program Transformation," Apr. 1994, Proceedings of the Eighth International Parallel Processing Symposium.

Lee et al., "Automatic Data and Computation Decomposition on Distributed Memory Parallel Computers," Jan. 2002, ACM Transactions on Programming Languages and Systems, vol. 24, No. 1, pp. 1-50.

* cited by examiner

```
for (i = 0; i < 100; i++) {
    a[i+3] = b[i+1] + c[i+2];
}
```

*Figure 1*

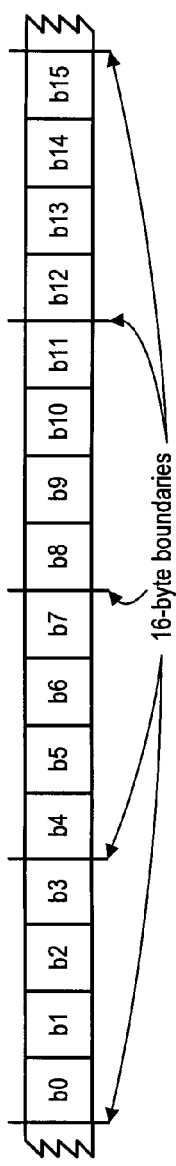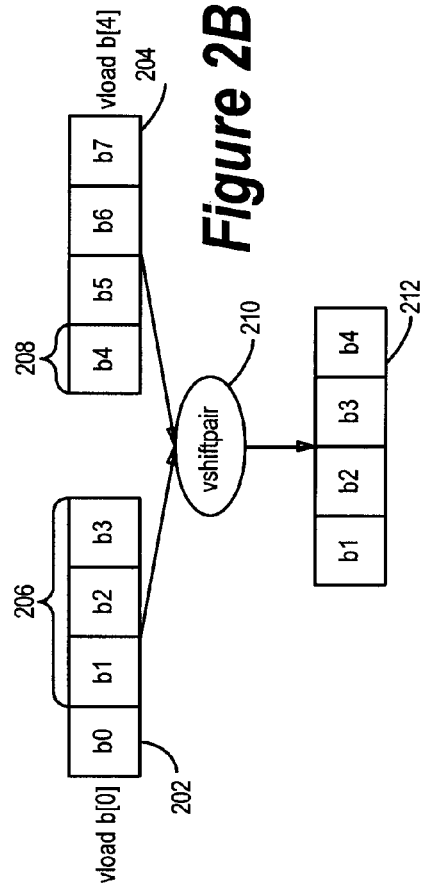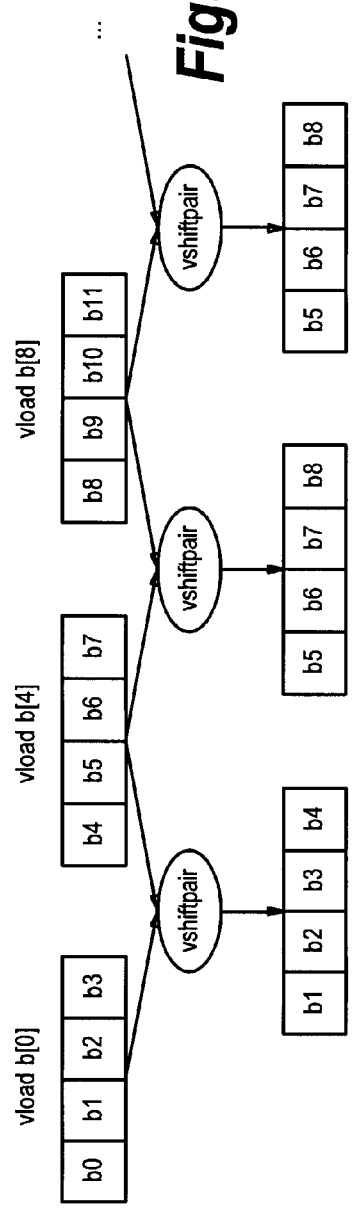

Figure 3A
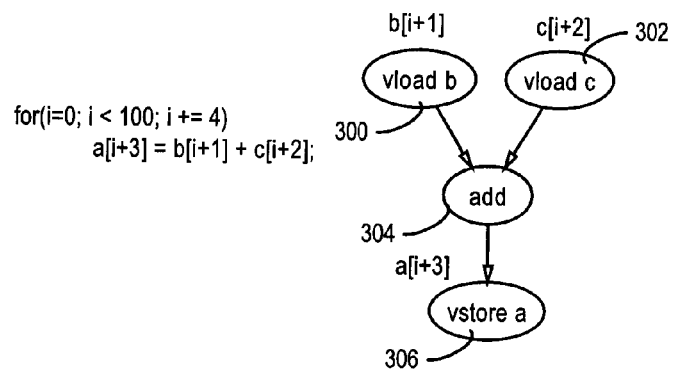
Figure 3B
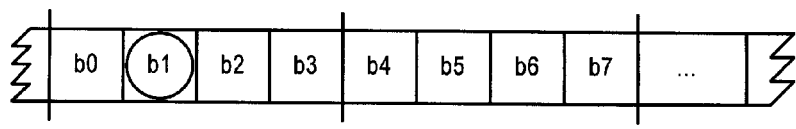
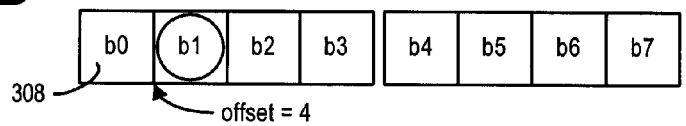
Figure 3C
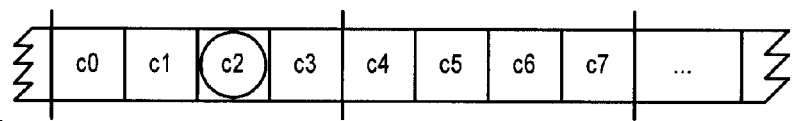
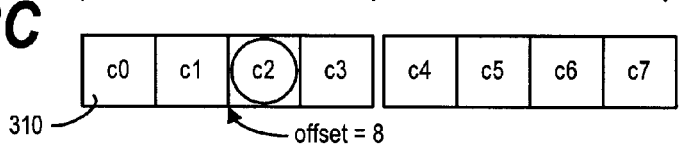
Figure 3D
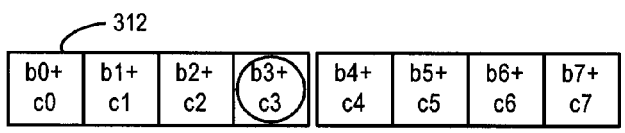
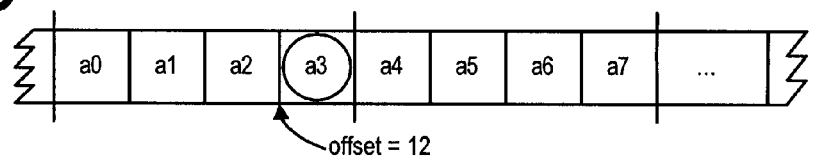

for(i=0; i < 100; i += 4)
    a[i+3] = b[i+1] + c[i+1];

for(i=0; i < 100; i += 4)
    a[i+3] = b[i+1] * c[i+2] + d[i+1];

GenSimdExpr(n)

1    if $n \equiv \text{VLOAD}(addr(i))$ return $\text{vload}(addr(i))$
2    if $n \equiv \text{VSPLAT}(x)$ return $\text{vsplat}(\text{GenExpr}(x))$
3    if $n \equiv \text{VSHIFTSTREAM}(src, O_{src}, c)$
4    return $\text{GenSimdShiftStream}(src, O_{src}, c)$
5    if $n \equiv \text{VOP}(src_1, \ldots, src_n)$
6      for $(k = 1..n)$ $vreg_k \leftarrow \text{GenSimdExpr}(src_k)$
7    return $\text{vop}(vreg_1, \ldots, vreg_n)$

GenSimdShiftStream(n, from, to)

8    $shift \leftarrow (from - to) \bmod V$
9    if $(from > to \,|\, \text{Runtime}(to))$      /* shift left */
10    $curr \leftarrow \text{GenSimdExpr}(n)$
11    $next \leftarrow \text{GenSimdExpr}(\text{Substitute}(n, i \leftarrow i + B))$
12    return $\text{vshiftpair}(curr, next, shift)$
13    else if $(from < to \,|\, \text{Runtime}(from))$      /* shift right */
14    $curr \leftarrow \text{GenSimdExpr}(n)$
15    $prev \leftarrow \text{GenSimdExpr}(\text{Substitute}(n, i \leftarrow i - B))$
16    return $\text{vshiftpair}(prev, curr, shift)$

*Figure 7*

GenSimdStmt-Prologue(addr(i), src)

1 $splicePoint \leftarrow addr(0) \bmod V$
2 $new \leftarrow \text{GenSimdExpr}(src)$
3 $old \leftarrow \text{vload}(addr(0))$
4 $spliced \leftarrow \text{vsplice}(old, new, splicePoint)$
5 GenStoreStmt($addr(0), spliced,'$ in prologue$'$)

GenSimdStmt-Steady(addr(i), src)

6 $new \leftarrow \text{GenSimdExpr}(src)$
7 GenStoreStmt($addr(i), new,'$ in loop$'$)

GenSimdStmt-Epilogue(addr(i), src, ub)

8 $splicePoint \leftarrow (addr(0) + ub * D) \bmod V$
9 $new \leftarrow \text{GenSimdExpr}(src)$
10 $old \leftarrow \text{vload}(addr(i))$
11 $spliced \leftarrow \text{vsplice}(new, old, splicePoint)$
12 GenStoreStmt($addr(i), spliced,'$ in epilogue$'$)

*Figure 9*

GenSimdStmtSP-Steady(addr(i), src)

1  $new \leftarrow$ GenSimdExprSP($src$)
2  GenStoreStmt($addr(i), new,$ 'in loop')

GenSimdExprSP(n)

3  if $n \equiv$ VLOAD($addr(i)$) return vload($addr(i)$)
4  if $n \equiv$ VSPLAT($x$) return vsplat(GenExpr($x$))
5  if $n \equiv$ VSHIFTSTREAM($src, O_{src}, to$)
6    return GenSimdShiftStream($src, O_{src}, c$)
7  if $n \equiv$ VOP($src_1, \ldots, src_n$)
8    for ($k = 1..n$) $vreg_k \leftarrow$ GenSimdExprSP($src_k$)
9  return vop($vreg_1, \ldots, vreg_n$)

GenSimdShiftStreamSP(n, from, to)

10  $shift \leftarrow (from - to) \bmod V$
11  if ($from > to$ | Runtime($to$))       /* shift left */
12    $first \leftarrow$ GenSimdExpr($n$)
13    $second \leftarrow$ GenSimdExprSP(Substitute($n, i \leftarrow i + B$))
14  else if ($from < to$ | Runtime($from$))       /* shift right */
15    $first \leftarrow$ GenSimdExpr(Substitute($n, i \leftarrow i - B$))
16    $second \leftarrow$ GenSimdExprSP($n$)
17  GenStoreStmt('old', $first,$ 'in prologue')
18  GenStoreStmt('new', $second,$ 'in loop')
19  GenStoreStmt('old', vload('new'), 'bottom of loop')
20  return vshiftpair(vload('old'), $second, shift$)

*Figure 10*

FRAMEWORK FOR EFFICIENT CODE GENERATION USING LOOP PEELING FOR SIMD LOOP CODE WITH MULTIPLE MISALIGNED STATEMENTS

CROSS-REFERENCE TO RELATED APPLICATIONS

This application is a continuation-in-part of commonly assigned, co-pending U.S. Non-Provisional Patent application Ser. No. 10/862,483, entitled "SYSTEM AND METHOD FOR EFFICIENT DATA REORGANIZATION TO SATISFY DATA ALIGNMENT CONSTRAINTS," filing date Jun. 7, 2004, which is incorporated herein by reference. This application is also related to U.S. Non-Provisional patent application Ser. No. 10/919,131, entitled "SYSTEM AND METHOD FOR SIMD CODE GENERATION FOR LOOPS WITH MIXED DATA LENGTHS," U.S. Non-Provisional patent application Ser. No. 10/919,005, entitled "FRAMEWORK FOR GENERATING MIXED-MODE OPERATIONS IN LOOP-LEVEL SIMDIZATION," U.S. Non-Provisional patent application Ser. No. 10/919,115, entitled "FRAMEWORK FOR INTEGRATED INTRA- AND INTER-LOOP AGGREGATION OF CONTIGUOUS MEMORY ACCESSES FOR SIMD VECTORIZATION," and U.S. Non-Provisional patent application Ser. No. 10/918,996, entitled "SYSTEM AND METHOD FOR SIMD CODE GENERATION IN THE PRESENCE OF OPTIMIZED MISALIGNED DATA REORGANIZATION," which are all filed even date hereof, assigned to the same assignee, and incorporated herein by reference.

BACKGROUND OF THE INVENTION

1. Technical Field

The present invention relates in general to a system and method for vectorizing loop code for execution on Single Instruction Multiple Datapath (SIMD) architectures that impose strict alignment constraints on the data.

2. Description of the Related Art

Multimedia extensions (MMEs) have become one of the most popular additions to general-purpose microprocessors. Existing multimedia extensions can be characterized as Single Instruction Multiple Datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. See, e.g., Ren, Gang, et al. A Preliminary Study on the Vectorization of Multimedia Applications. In 16*th International Workshop of Languages and Compilers for Parallel Computing*. October 2003. To distinguish between the two types of vectorization, we refer to the latter as simdization. One such fundamental difference comes from the memory unit. The memory unit of a typical SIMD processor bears more resemblance to that of a wide scalar processor than to that of a traditional vector processor. In the VMX instruction set found on certain POWERPC microprocessors (produced by International Business Machines Corporation and Motorola, Inc.), for example, a load instruction loads 16-byte contiguous memory from 16-byte aligned memory, ignoring the last 4 bits of the memory address in the instruction. The same applies to store instructions. In this paper, architectures with alignment constraints refer to machines that support only loads and stores of register-length aligned memory.

There has been a recent spike of interest in compiler techniques to automatically extract SIMD parallelism from programs. See, e.g., LARSEN, Samuel, et al. Exploiting Superword Level Parallelism with Multimedia Instruction Sets. In *Proceedings of SIGPLAN Conference on Programming Language Design and Implementation*. June 2000, pp. 145-156; BIK, Aart, et al. Automatic Intra-Register Vectorization for the Intel Architecture. *Int. J. of Parallel Programming*. April 2002, vol. 30, no. 2, pp. 65-98; KRALL, Andreas, et al. Compilation Techniques for Multimedia Processors. *Int. J. of Parallel Programming*. August 2000, vol. 28, no. 4, pp. 347-361; SRERAMAN, N., et al. A Vectorizing Compiler for Multimedia Extensions. *Int. J. of Parallel Programming*, August 2000, vol. 28, no. 4, pp. 363-400; LEE, Corinna G., et al. Simple Vector Microprocessors for Multimedia Applications. In *Proceedings of International Symposium on Microarchitecture*. 1998, pp. 25-36; and NAISHLOS, Dorit, et al. Vectorizing for a SIMD DSP Architecture. In *Proceedings of International Conference on Compilers, Artchitectures, and Synthesis for Embedded Systems*. October 2003, pp. 2-11. This upsurge was driven by the increasing prevalence of SIMD architectures in multimedia processors. Two principal techniques have been used, the traditional loop-based vectorization pioneered for vector supercomputers (e.g., ALLEN, John Randal, et al. Automatic Translation of Fortran Programs to Vector Form. *ACM Transactions on Programming Languages and Systems*. October 1987, vol. 4, pp. 491-542; and ZIMA, Hans, et al. Supercompilers for Parallel and Vector Computers. Reading, MA: Addison-Wesley/ACM Press, 1990. ISBN 0201175606.) and the unroll-and-pack approach first proposed by Larsen and Amarasinghe in LARSEN, Samuel, et al. Exploiting Superword Level Parallelism with Multimedia Instruction Sets. In *Proceedings of SIGPLAN Conference on Programming Language Design and Implementation*. June 2000, pp. 145-156.

The alignment constraints of SIMD memory units present a great challenge to automatic simdization. Consider the code fragment in FIG. 1 where integer arrays a, b, and c are aligned (An aligned reference means that the desired data reside at an address that is a multiple of the vector register size.). Although this loop is easily vectorizable for traditional vector processors, it is non-trivial to simdize it for SIMD architectures with alignment constraints. Hence, the most commonly used policy today is to simdize a loop only if all memory references in the loop are aligned.

A very extensive discussion of alignment considerations is provided by LARSON, Samuel, et al. Increasing and Detecting Memory Address Congruence. In *Proceedings of 11th International Conference on Parallel Architectures and Compilation Techniques*. September 2002. However, LARSON is concerned with the detection of memory alignments and with techniques to increase the number of aligned references in a loop, whereas our work focuses on generating optimized SIMD codes in the presence of misaligned references. The two approaches are complementary. The use of loop peeling to align accesses was discussed in LARSON as well as in the aforementioned BIK reference. The loop peeling scheme is equivalent to the eager-shift policy with the restriction that all memory references in the loop must have the same misalignment. Even under this condition, our scheme has the advantage of generating simdized prologue and epilogue, which is the by-product of peeling from the simdized loop.

Direct code generation for misaligned references have been discussed by several prior works. The vectorization of misaligned loads and stores using the VIS instruction set is described in CHEONG, Gerald, et al. An Optimizer for Multimedia Instruction Sets. In *Second SUIF Compiler Workshop*. August 1997. The aforementioned BIK, et al. reference described a specific code sequence of aligned loads and shuffle to load memory references that cross cache line boundaries, which is implemented in Intel's compiler for SSE2. However, their method is not discussed in the context of general misalignment handling.

The VAST compiler, a commercial product by Crescent Bay Software, has some limited ability to simdize loops with multiple misaligned references, unknown loop bounds, and runtime alignments, and exploit the reuse when aligning a steam of contiguous memory. The VAST compiler, however, produces less than optimal simdized code, as its highly generalized scheme for handling misalignment can produce additional compilation overhead.

An interesting simdization scheme using indirect register accesses is discussed in the aforementioned NAISHLOS, et al. reference. However, their method is specific to the eLite processor, which supports more advanced vector operations (such as gather and scatter operations) than are available on typical MME processors. In SHIN, Jaewook, et al. Compiler-Controlled Caching in Superword Register Files for Multimedia Extension Architectures. In *Proceedings of International Conference on Parallel Architectures and Compilation Techniques*. September 2002, register packing and shifting instructions were used to exploit temporal and spatial reuse in vector registers. However, their work does not address alignment handling.

Another work that is of note, but which is in the area of compiling for distributed memory systems as opposed to SIMD architectures, is CHATTERJEE, Siddhartha, et al. Modeling Data-Parallel Programs with the Alignment-Distribution Graph. *J. of Programming Languages*. 1994, vol. 2, no. 3, pp. 227-258.

What is needed, therefore, is a system and method of general application for generating an efficient vectorization of loop code involving misaligned continuous memory arrays. The present invention provides a solution to these and other problems, and offers other advantages over previous solutions.

SUMMARY

A system and method is provided for vectorizing misaligned references in compiled code for SIMD architectures that support only aligned loads and stores. In this framework, a loop is first simdized as if the memory unit imposes no alignment constraints. The compiler then inserts data reorganization operations to satisfy the actual alignment requirements of the hardware. Finally, the code generation algorithm generates SIMD codes based on the data reorganization graph, addressing realistic issues such as runtime alignments, unknown loop bounds, residual iteration counts, and multiple statements with arbitrary alignment combinations. Loop peeling is used to reduce the computational overhead associated with misaligned data. A loop prologue and epilogue are peeled from individual iterations in the simdized loop, and vector-splicing instructions are applied to the peeled iterations, while the steady-state loop body incurs no additional computational overhead.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1 is a diagram of a loop in a C-like programming language that may be simdized/vectorized in accordance with a preferred embodiment of the present invention;

FIGS. 2A-2C are diagrams illustrating a basic mechanism to implement a misaligned load on a typical SIMD unit with alignment constraints in accordance with a preferred embodiment of the present invention;

FIG. 3A is a directed acyclic graph (DAG) illustrating a naive vectorization of a loop in accordance with preliminary actions taken in a preferred embodiment of the present invention;

FIGS. 3B-3D are diagrams that illustrate a process of directly executing the naive vectorization of FIG. 3A in an SIMD architecture requiring strict adherence to alignment constraints;

FIG. 7 is a diagram of a SIMD code generation algorithm for expressions in accordance with a preferred embodiment of the present invention;

FIG. 9 is a diagram of a SIMD code generation algorithm for generating loop prologue, steady-state, and epilogue code segments in accordance with a preferred embodiment of the present invention;

FIG. 10 is a diagram of a SIMD code generation algorithm utilizing software pipelining to further enhance the performance of generated SIMD code in accordance with a preferred embodiment of the present invention;

DETAILED DESCRIPTION

Figure 4A:
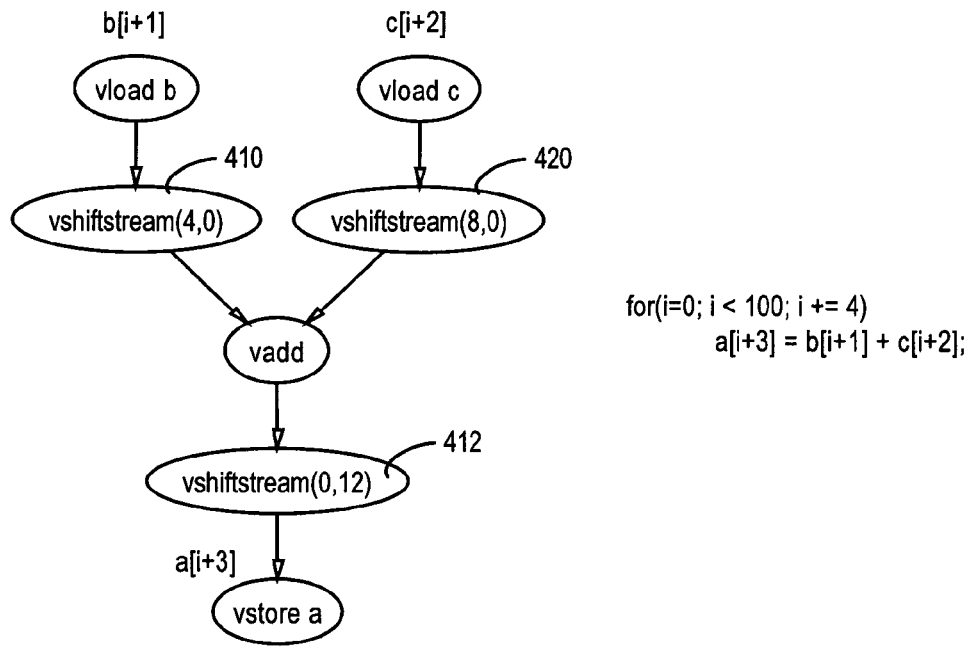
FIG. 4A is a data realignment graph illustrating the application of a zero shift data alignment policy in accordance with a preferred embodiment of the present invention.

The following is intended to provide a detailed description of an example of the invention and should not be taken to be limiting of the invention itself. Rather, any number of variations may fall within the scope of the invention, which is defined in the claims following the description.

1. Overview

A preferred embodiment of the present invention provides a method, computer program product, and data processing system of general application for simdizing loops with misaligned stride-one memory references for SIMD architectures with alignment constraints. This is achieved by automatically generating data reorganization instructions during the simdization to align data in registers.

Using the array reference b[i+1] as an example, FIGS. 2A-2C illustrate the basic mechanism to implement a misaligned load on a typical SIMD unit with alignment constraints in accordance with a preferred embodiment of the present invention. FIG. 2A shows an array b[] consisting of elements (b0, b1, b2, etc.) of four bytes each. Since in this example the SIMD unit is 16 bytes wide, the array in FIG. 2A is divided into aligned 16-byte segments, denoted by vertical bars.

As shown in FIG. 2B, an instruction vload is used to load vectors 202 and 204 from 16-byte aligned memory and an instruction vshiftpair 210 to select consecutive elements 206 and 208 of two vector registers (vectors 202 and 204) to an output vector register 212. The misalignment handling can be further improved, by reusing the vector loads across loop iterations as shown in FIG. 2C. A preferred embodiment of the present invention is able to exploit such reuse and guarantees that data associated with a single static reference in the original loop will not be loaded twice.

A preferred embodiment of the present invention adopts a systematic and non-intrusive approach to the handling of misalignment in simdization. First, the loop is simdized as if for a machine with no alignment constraints. Second, data reorganization operations are inserted into the simdized code to satisfy the actual alignment constraints.

The second step occurs in following two phases which communicate via a data reorganization graph.

The Data Reorganization Phase inserts data reordering operations in the code produced by the previous step to satisfy the actual alignment constraints. Optimizations are applied to minimize the number of data reordering operations generated. This phase is relatively architecture-independent and its output is a data reorganization graph.

The SIMD Code Generation Phase maps the simdized operations (including the data reordering operations inserted by the previous phase) to SIMD instructions specific to the target platform. This phase addresses issues such as runtime alignments, unknown loop bounds, multiple misalignments, and multiple statements.

In a preferred embodiment, simdization occurs after several loop transformations such as loop interchange and loop distribution that enhance simdization by removing loop-carried dependences along innermost loops. It is followed by other loop transformations that can significantly improve the quality of the simdized codes, notably loop unrolling that removes needless copy operations and a special form of common subexpression elimination, referred to as Predictive Commoning (PC) which exploits the reuse among consecutive loop iterations. See O'BRIEN, Kevin. Predictive Commoning: A Method of Optimizing Loops Containing References to Consecutive Array Elements. In *IBM Interdivisional Technical Liaison*, 1990. The back-end code generator (TOBEY) has been extended to target a PowerPC-based processor with SIMD vector units. It performs various target-specific optimizations including instruction scheduling and register allocation.

Performance evaluation indicates that near-peak speedup can be achieved even in the presence of large numbers of misaligned references in the loop. Comparing the dynamic instruction count of simdized codes generated by a preferred embodiment of the present invention to an ideal scalar instruction count, we achieve the following speedups over a wide range of loop benchmarks: With 4 integers packed in a vector register and with on average ¾ of the static memory references misaligned, speedups of up to 3.71 and 2.69 are achieved with and without static alignment information, respectively. With 8 short integers packed in a vector register and with on average ⅞ of the memory references misaligned, speedups of up to 6.06 and 4.64 with and without static alignment information, respectively, are achieved.

In summary, a preferred embodiment of the present invention provides a number of characteristic advantages and improvements to the art, including (but not limited to) the following:

A preferred embodiment of the present invention provides a new abstraction, the data reorganization graph, which incorporates alignment constraints and enables the systematic generation and optimization of data reorganization operations during simdization.

A preferred embodiment of the present invention provides a robust algorithm to simdize misaligned loads and stores including loops with multiple misaligned references, runtime alignments, unknown loop bounds, and multiple statements.

A preferred embodiment of the present invention provides an efficient code generation algorithm that exploits reuse on stride-one misaligned memory references to minimize the number of vector loads and stores.

A preferred embodiment of the present invention provides near-peak speedup even in the presence of large numbers of misaligned memory references.

The target machine of a preferred embodiment of the present invention contains generic 16-byte wide SIMD units that are representative of most SIMD architectures currently available. The load-store unit supports 16-byte aligned loads and stores only. Data reorganization is supported by a permute operation that selects arbitrary bytes from two vector registers, similar to the byte permutation operation described in Section 3.2.

2. SIMD Processing for Multimedia Applications

Multimedia extensions have been adopted by many major computer/microprocessor manufacturers. Some examples of existing multimedia extensions include MMX/SSE by Intel Corporation, 3DNow! by Advanced Micro Devices, Inc., VMX by International Business Machines Corporation in cooperation with Motorola, Inc., and VIS by Sun Microsystems, Inc. Similar architectures can also be found in graphics engines and game consoles such as NVDIA and ATI graphics cards, Sony Playstation 2 and Microsoft XBOX game consoles. SIMD instruction set extensions are also commonly employed in digital signal processors (DSPs), such as the TMS320C64xx series of digital signal processors manufactured by Texas Instruments, Inc.

These processing units can be characterized as SIMD processors operating on packed fixed-length vectors. A typical SIMD unit provides a set of vector registers that are usually 8- or 16-byte wide. A typical unit supports SIMD operations on 1, 2, 4, and possibly 8 byte data types. For example, a 2-byte vector add on a 16-byte vector would add 8 distinct data in a vector in parallel. In terms of memory units, most of the media processing units mentioned above provide a load/store unit similar to that employed in VMX, which ignores the least significant bits of a given memory address, thus forcing all vector loads and stores to be memory-aligned.

3. Generic Data Reorganization Operations

Most SIMD architectures support a rich set of operations to reorder data in vector registers. These operations are heavily used in the alignment handling scheme employed by a preferred embodiment of the present invention. In order to describe this preferred embodiment in a general sense, three generic data reorganization operations are defined here. These generic operations can be easily mapped to corresponding instructions of specific platforms. The below discussion illustrates their implementation on existing SIMD architectures, while making reference to the VMX instruction set for illustration and clarification purposes. In the rest of this description, the symbol V is used to denote the vector length.

vsplat(x) replicates a scalar value x to form a full vector by V/sizeof(x) times. This operation is directly supported by most SIMD architectures, e.g., vec_splat on VMX.

vshiftpair($v_1,v_2,\lambda$) selects bytes $\lambda,\lambda+1, K,\lambda+V-1$ from a double-length vector constructed by concatenating vectors $v_1$ and $v_2$, where $0 \leq \lambda < V$. This operation can be implemented by permute operations that combine two vectors through a permute vector, e.g., vec_perm on VMX. Each byte of the permute vector specifies which byte of the two concatenated input vectors is selected. The permute vector can be constructed as vector literal ($\lambda,\lambda+1, K,\lambda+V-1$) if $\lambda$ is known at compile-time, or as the result of adding vsplat((char)$\lambda$) with vector literal (0, K,V−1).

vsplice($v_1,v_2,\lambda$) splices two vectors $v_1$ and $v_2$ at a splice point specified by an integer value $\lambda$. Specifically, it concatenates the first $\lambda$ bytes of $v_1$ with the last (V−$\lambda$) bytes of $v_2$ when $0<\lambda<V$, copies $v_1$ when $\lambda \leq 0$, and copies $v_2$ when $\lambda \geq V$.

This operation can be implemented by the select operation available on most SIMD architectures, e.g., vec_sel on VMX. For each bit of the output vector, this operation selects the bit from one of the two input vector registers based on a mask vector. The mask vector can be computed as the result of comparing vector literal (0,1, K,V−1) against vsplat((char)$\lambda$).

4. Data Reorganization Phase

In this section, an intuitive example of why byte reordering operations are needed for alignment handling is provided in Section 4.1. The concept of stream and stream shift is then introduced in Section 4.2, and the data reorganization graph is introduced in Section 4.3. Graph optimizations to minimize the amount of data reorganization are presented in Section 4.4.

For the simplicity of the description, the code examples used in this section assume that the vector length is 16 bytes, the base address of an array is 16-byte aligned, and the values are 32 bit integer values.

4.1 Constraints of a Valid Simdization

Figure 1:
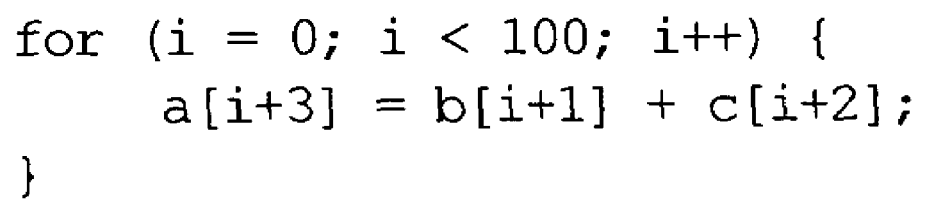

Consider our original example of a[i+3]=b[i+1]+c[i+2] in FIG. 1. Since there is no loop-carried dependence, this loop can be easily simdized for machines with no alignment constraints. However, such simdized code is invalid for SIMD units that support only aligned loads and stores. FIGS. 3A-3D illustrate the problem of execution the simdized loop on a hardware with alignment constraints.

FIG. 3A illustrates, in the form of a directed acyclic graph (DAG), the operations and data dependencies represented in a single iteration of the vectorized (C/C++/Java-style) for loop "for(i=0;i<100;i+=4) a[i+3]=b[i+1]+c[i+2];". Note that since a vector length of 16 bytes and a data size of 4 bytes is assumed, the loop is incremented by 4 (for 4 data elements) each iteration. The naive vectorization depicted in FIG. 3A assumes byte addressability (i.e., that vectors that are not 16-byte-aligned may be loaded with a single load instruction). A vector load instruction vload 300 loads 4 elements of array b starting at array element b[i+1]. Similarly, vector load instruction vload 302 loads 4 elements of array C starting at array element c[i+2]. The two 16-byte vectors are added (vadd instruction 304) and the result stored in array a starting at array element a[i+3].

Consider now the i=0 iteration of the simdized loop in FIG. 3A, focusing on the values of expression a[3]=b[1]+c[2] that are highlighted by white circles on gray background in FIGS. 3B-3D. FIGS. 3B-3D demonstrate the result of executing the naively vectorized loop in FIG. 3A on hardware having alignment constraints, such as the aforementioned VMX. The vload b[1] operation loads vector b[0], . . . ,b[3] with the desired b[1] value at byte-offset 4 in its vector register (vector register 308), as shown in FIG. 3B. Similarly, the vload c[2] operation loads c[0], . . . ,c[3] with c[2] at byte offset 8, as depicted by vector register 310 in FIG. 3C. Adding these two vector registers yields the values b[0]+c[0], . . . ,b[3]+c[3] (vector register 312) as illustrated in FIG. 3D. This is clearly not the result specified by the original b[i+1]+c[i+2] computation.

Based on these observations, we list the following constraints that a valid simdization must satisfy:

1. When performing a vector load, the 16-byte alignment of the load address dictates the byte-offset of the data in its destination vector register. For example, the 16-byte alignment of b[1] and c[2] in memory is 4 and 8 bytes, respectively, as is the byte offset in their respective vector registers.

2. When computing vector operations (possibly excluding data reordering operations), the data involved in the original operation must reside at the same byte-offset in their respective vector registers.

3. When performing a vector store, the byte-offset of the data in the vector register must match the memory alignment of the store address. For example, b[1]+c[2], when being stored to a[3], must reside at byte-offset 12 in its vector register to match the memory alignment of a[3]

Thus, data reorganization for a valid simdization can be summarized as reordering data in vector registers so that the above specified constraints are satisfied. The formalization of these constraints will be presented later in Section 4.3.

4.2 Streams and Stream Shifts

Given a stride-one memory reference in a loop, a memory stream corresponds to all the contiguous locations in memory addressed by that memory reference over the lifetime of the loop. For example, the gray boxes in the memory array 400 in FIG. 4B depict the memory stream associated with b[i+1] in the i=0 to 99 loop of FIG. 1, spanning the values from b[1] to b[100] (memory stream 402). Similarly, in FIG. 4C, the memory stream associated with c[i+2] (memory stream 406) spans the values from c[2] to c[101].

Similarly, a register stream corresponds to all the consecutive registers produced by a single vector operation over the lifetime of a loop. Note that, as a memory stream is read from memory by vector loads in discrete chunks of 16 bytes, extra values may be introduced at the beginning and the end of a register stream. For example, in FIG. 4B, the first value in register stream 408 is not b[1] but b[0].

To distinguish the desired values from the extra values in a register stream, we introduce the concept of a stream offset, defined as the byte-offset of the first desired value of a register stream. Namely, stream offset is the byte-offset of the data associated with the i=0 computation. Stream offset values are by definition nonnegative and smaller than the vector length. For example, in FIG. 4B, register stream 408 has an offset of 4 bytes.

In Section 4.1, we established that a simdization is valid when all of the data processed by an original operation reside at the same byte-offset in their respective vector registers. To that effect, we introduce a new data reorganization operator, vshiftstream($c_1,c_2$), which shifts all values of a register stream among consecutive registers of that stream. Essentially, vshiftstream takes an input register stream whose offset is $c_1$ and generates a register stream of the same values but with a stream offset of $c_2$.

Figure 4B:
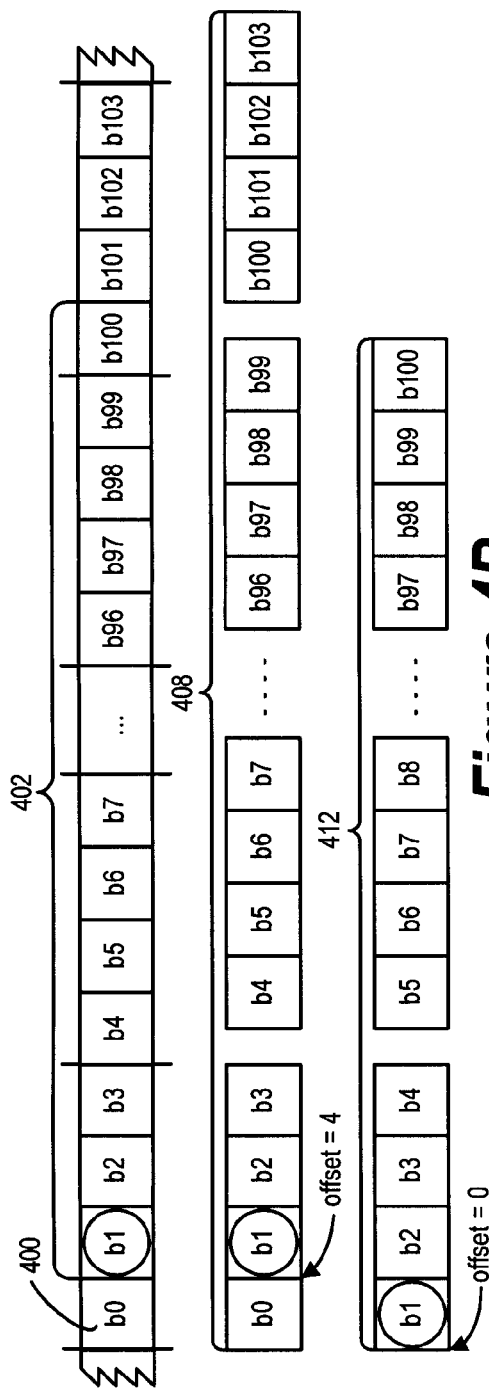
FIGS. 4B-4D are diagrams that illustrate a process of executing simdized code generated in accordance with the data realignment graph of FIG. 4A.

For example, vshiftstream(4,0) (operation 410) in FIG. 4A shifts the register stream associated with vload b[i+1] (register stream 408) to the left by 4 bytes, as shown by shifted register stream 412 in FIG. 4B, thus eliminating the extra initial value b[0] from the register stream. The same operator can also be used to shift values to the right, as shown in FIG. 4D, where vshiftstream(0,12) (operation 412 in FIG. 4A) shifts right the register stream of b[i+1]+c[i+2] (register stream 414) by 12 bytes. The resulting register stream (register stream 416) has an offset of 12, which matches the alignment of memory stream 418, which is generated by reference a[i+3].

4.3 Data Reorganization Graph

A data reorganization graph is an expression tree augmented with data reordering operations. FIG. 4A is an example of such a graph. Each node in the graph is associated with a stream offset property. Since the stream offset property is key to the definition of a valid data reorganization graph, described below is a method for computing the stream offset for each type of data reorganization graph nodes.

The rest of this description uses the following notations: V for the vector length, i for the loop counter, O and $O_x$ for the stream offset associated with the current node in consideration and any other node x, respectively. For an offset known at compile time, $O_x$ is a compile-time constant that is directly used by the below-described algorithms; otherwise, for runtime offsets, $O_x$ is a register value that is computed at runtime by anding memory addresses with literal V−1.

VLOAD(addr(i)) This node loads a vector from a stride-one memory reference addr(i). This operation produces a register stream whose stream offset is defined by the alignment of addr(i), i.e., $$O \leftarrow \mathrm{addr}(i=0) \bmod V. \tag{1}$$

VSTORE(addr(i),src) This node stores a vector stream produced by node src to a stride-one reference addr(i). This node does not have a stream offset. However, in order for the store to be valid, the stream offset of node src must satisfy the following condition:

$$O_{src} = \mathrm{addr}(i=0) \bmod V. \tag{C.2}$$

VOP($src_1, \ldots, src_n$), This node represents a regular vector operation that takes as input register streams associated with nodes $src_1, \ldots, src_n$ and produces one output register stream.

In order for the computation to be valid, input register streams must have matching stream offsets, i.e., $$O_{src_1} = O_{src_2} = K = O_{src_n}. \tag{C.3}$$

The stream offset of this node is defined by the uniform stream offset of its input nodes, i.e., $$O \leftarrow O_{src_1}. \tag{4}$$

VSHIFTSTREAM(src,$O_{src}$,c) This node shifts the register stream associated with the input node src and stream offset $O_{src}$ to a register stream with a stream offset c. This is a data reorganization node which can change the offset of a register stream. By the definition of the operation, the stream offset of this node is:

$$O \leftarrow c. \tag{5}$$

where $0 \leq c < V$ and must be a loop invariant.

VSPLAT(x) This node replicates a loop invariant x to produce a register stream with concatenated values of x. The stream offset of this node is "undefined" and is associated with the symbol $_T$, as the same value is replicated in all register slots, i.e., $$O \leftarrow _T \tag{6}$$

Note that $_T$ can be any defined value in (C.2) and (C.3).

Essentially, (C.2) and (C.3) specify the constraints that must be satisfied to produce a valid data reorganization graph. They are the formalization of the second and the third constraints described in Section 4.1.

4.4 Generating a Data Reorganization Graph

A valid data reorganization graph requires the stream offset of each node in the graph to satisfy Constraints (C.2) and (C.3). In the presence of misalignments, this property is only achievable by judicious placement of data reordering nodes such as VSHIFTSTREAM nodes in the original expression tree. We investigate several policies for placing VSHIFTSTREAM nodes to generate a valid data reorganization graph.

Zero-Shift Policy

The main idea behind this policy is to (1) shift each misaligned register stream to a stream offset of 0 immediately after it is loaded from memory, and (2) to shift each register stream to the alignment of the store address just before it is stored to memory. More specifically, For each vload-node x, insert VSHIFTSTREAM(x,$O_x$,0) between x and its output nodes.

For each vstore-node x of VSTORE(addr(i),src), insert VSHIFTSTREAM(src,$O_{src}$,c) between nodes src and x where c is equal to addr(i=0) mod V.

For each loop invariant node x used as a register stream, insert VSPLAT(x) between x and its output node.

The simdization example depicted in FIG. 4A uses the zero-shift policy. This policy is the least optimized in terms of the number of data reorganization operations, since it inserts one VSHIFTSTREAM for each misaligned memory stream. In the case of FIG. 4A, since all three memory streams (arrays a, b, and C) are mutually misaligned, a VSHIFTSTREAM is inserted for each memory stream (VSHIFTSTREAMs 410, 420, and 412, respectively).

Figure 4C:
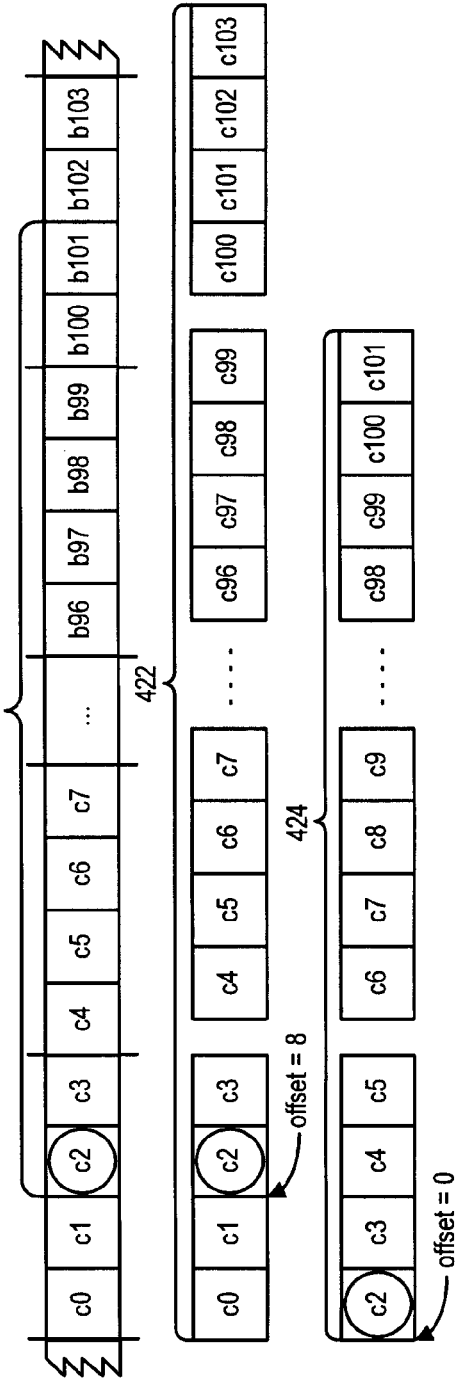
Figure 4D:
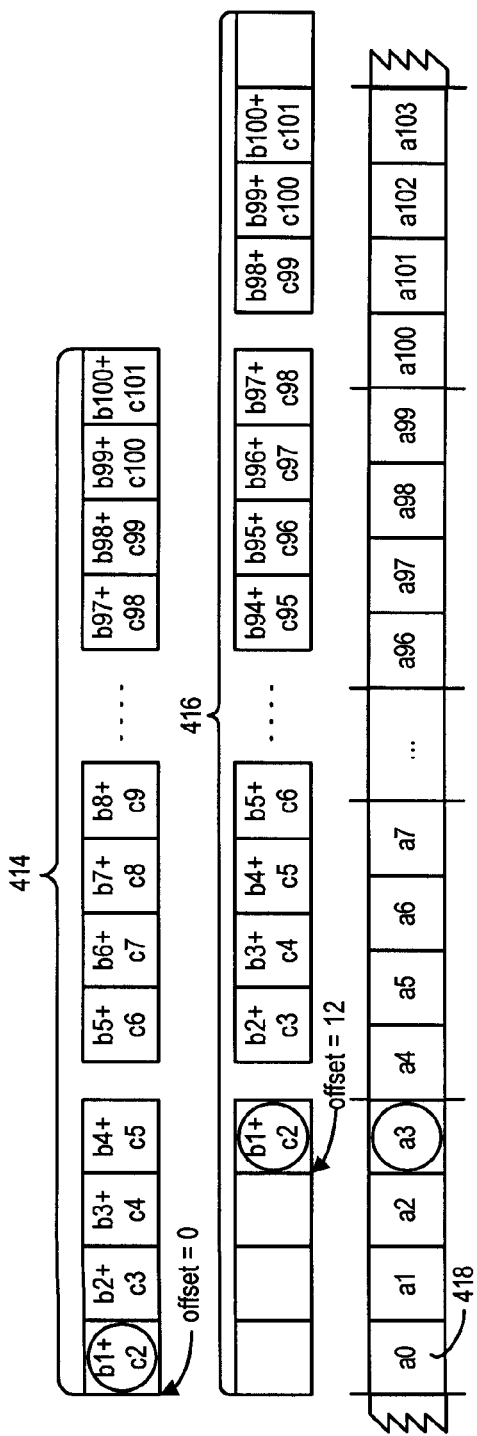

Thus, in FIG. 4B register stream 408 is shifted left by four bytes to obtain shifted register stream 412, and in FIG. 4C, register stream 422 is shifted left by 8 bytes to obtain shifted register stream 424. Shifted register streams 412 and 424 are then added (using the SIMD instruction for vector addition, VADD, to obtain register stream 414 in FIG. 4D. Register stream 414, however, must be shifted right by 12 bytes to obtain shifted register stream 416 before the result of the addition can be stored into memory 418.

Eager-Shift Policy

This policy shifts each misaligned load stream directly to the alignment of the store, rather than to 0, in the zero-shift policy. Specifically, for each VLOAD node x in the graph, the eager-shift policy inserts a VSHIFTSTREAM(x,$O_x$,c) between x and its output nodes, where c is the alignment of the store.

Due to code generation issues investigated in Section 5.2, this policy requires alignments of loads and stores to be known at compile-time. FIGS. 5A-5D illustrate the eager-shift placement policy, which lowering the total number of stream shift operations from 3 to 2, as compared to the zero-shift policy of FIGS. 4A-4D.

Figure 5A:
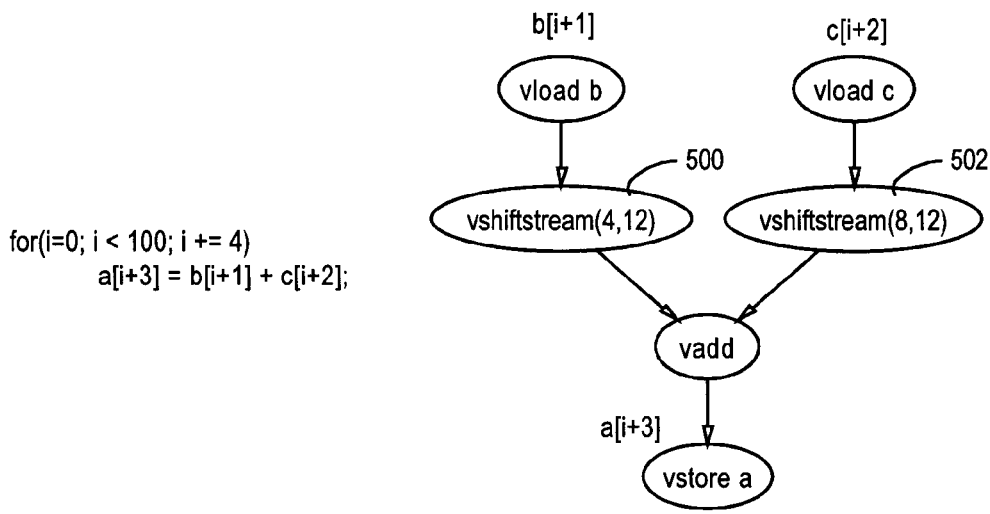
FIG. 5A is a data realignment graph illustrating the application of an eager shift data alignment policy in accordance with a preferred embodiment of the present invention.

FIG. 5A is a diagram of the data realignment graph for our example loop (for(i=0;i<100;i+=4) a[i+3]=b[i+1]+c[i+2];) as would be generated under the eager shift policy. Only two stream shifting operations (500 and 502) are utilized. Each of the operations shifts its respective input operand (b[i+1] or c[i+2]) such that the shifted input operands are already properly aligned for output (beginning at a[i+3]). This reduces the aggregate compiler-induced overhead for the resulting generated code, as instructions must only be generated for two shifting operations, rather than three, as in the case of the zero shift policy described in FIGS. 4A-4D.

Figure 5D:
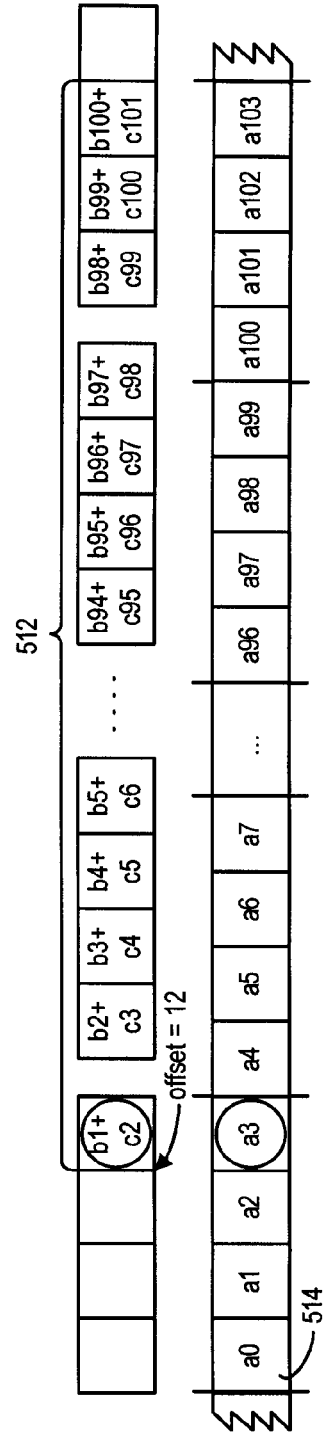
FIGS. 5B-5D are diagrams that illustrate a process of executing simdized code generated in accordance with the data realignment graph of FIG. 5A.
Figure 5B:
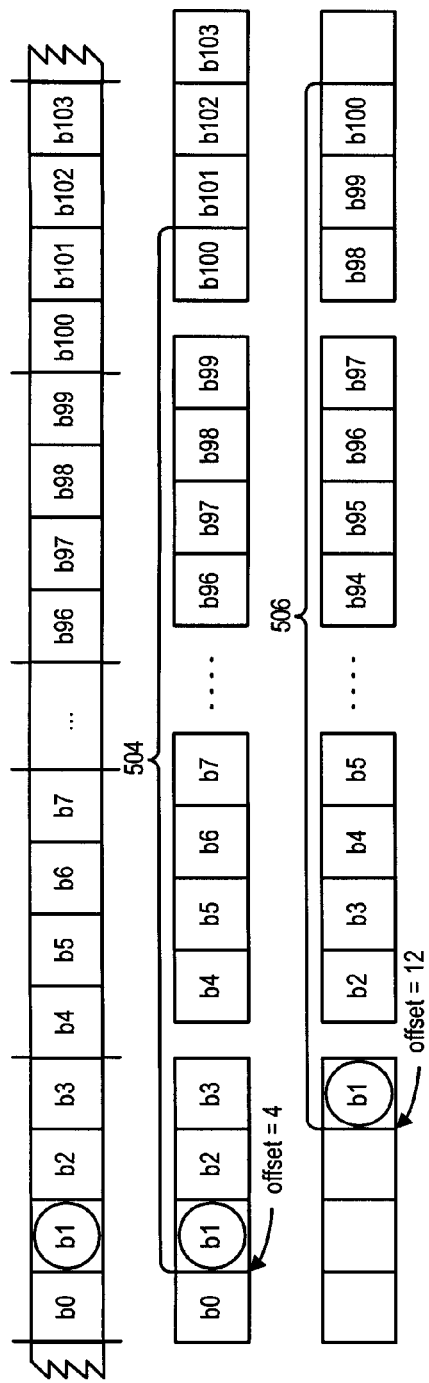
Figure 5C:
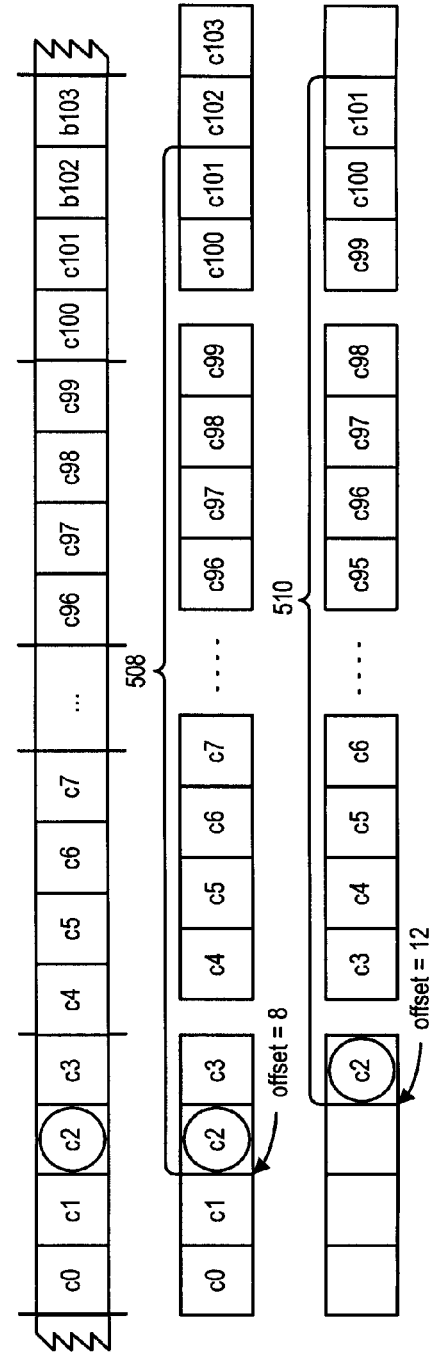

Thus, in FIG. 5B register stream 504 is shifted right by eight bytes to obtain shifted register stream 506, which is aligned for storage in array a[]. Likewise, in FIG. 5C, register stream 508 is shifted right by 4 bytes to obtain shifted register stream 510, which is also aligned for storage in array a[]. Shifted register streams 506 and 510 are then added (using the SIMD instruction for vector addition, VADD, to obtain register stream 512 in FIG. 5D. Unlike with the zero shift policy, however, no further shifting of register stream 512 is needed before the result of the addition can be stored into memory 514.

Lazy-Shift Policy

This policy is based on the eager-shift policy but is improved further by delaying stream shifts as long as Constraints (C.2) and (C.3) are satisfied.

Figure 6A:
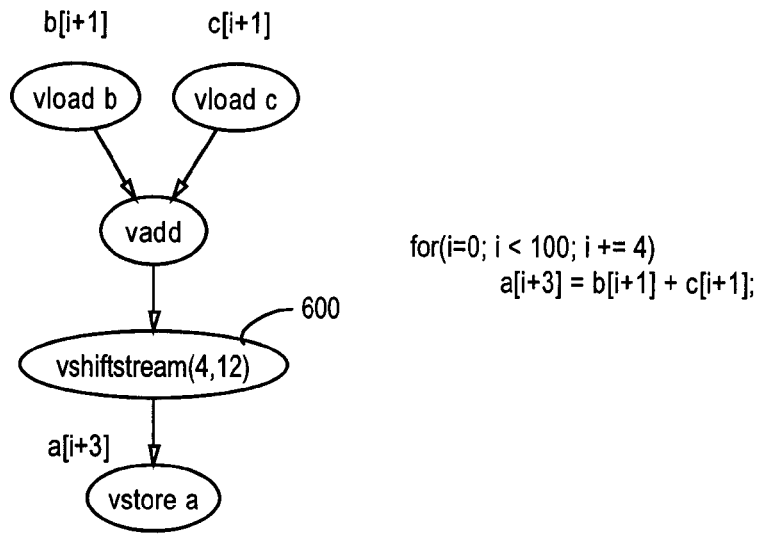
FIG. 6A is a data realignment graph illustrating the application of a lazy shift data alignment policy in accordance with a preferred embodiment of the present invention.

Consider the example a[i+3]=b[i+1]+c[i+1] in FIG. 6A. The zero-shift policy would insert 3 VSHIFTSTREAM operations. The eager-shift policy would require 2, one for each misaligned load. The lazy-shift policy, however, exploits the fact that b[i+1] and c[i+1] are relatively aligned, thus satisfying (C.3) and can be safely operated on as is. Only the result of the addition needs to be shifted so as to match the alignment of the store, as denoted by a single VSHIFTSTREAM operation 600 in FIG. 6A.

Dominant-Shift Policy

Figure 6B:
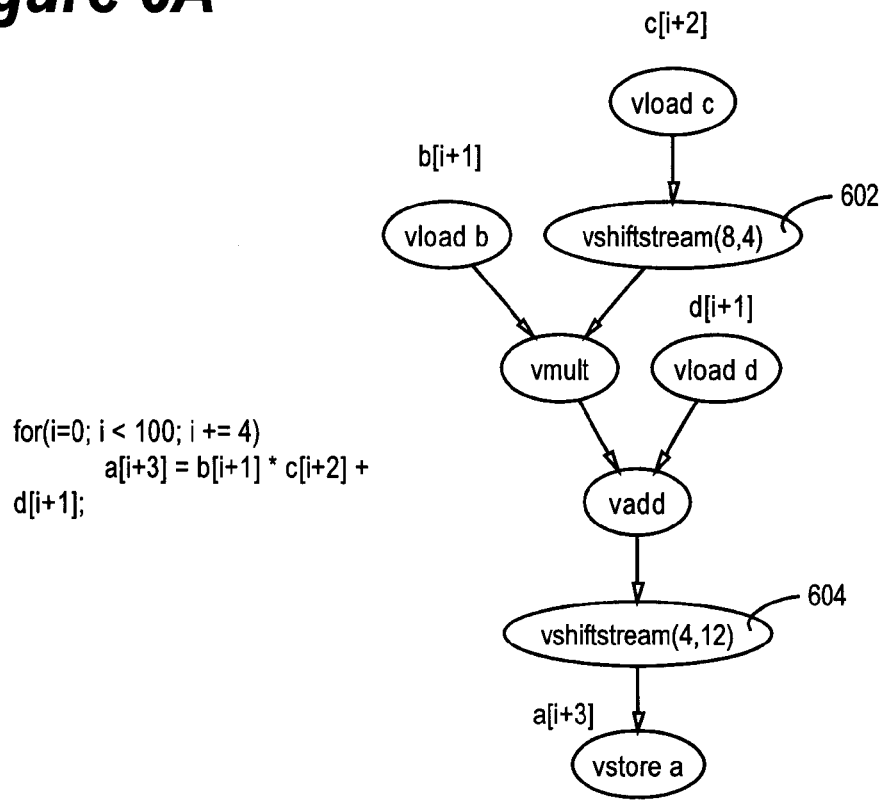
FIG. 6B is a data realignment graph illustrating the application of a dominant shift data alignment policy in accordance with a preferred embodiment of the present invention.

The dominant-shift policy further reduces the number of stream shifts by shifting register streams to the most dominant stream offset in the graph, i.e., the stream offset that occurs the most often among input operands. This policy is most effective if it can be combined with the lazy-shift policy (i.e., by performing a final "lazy shift" from the dominant stream offset to the stream offset required for writing the result). For example, in FIG. 6B, the dominant offset is a stream offset of 4 bytes (i.e., array subscript i+1). Shifting the c[i+2] stream to this offset (VSHIFTSTREAM operation 602), then performing a final "lazy shift" to stream offset 12 (VSHIFTSTREAM operation 604) decreases the number of VSHIFTSTREAM operations from 4 (for the zero-shift policy) to 2.

5. SIMD Code Generation

This section presents, in a developmental exposition, the code generation algorithm used in a preferred embodiment of the present invention. We start with an algorithm that simdizes a single-statement loop with compile-time alignments and loop bounds. We then augment the algorithm to handle multiple-statement loops, runtime alignments, and unknown loop bounds.

5.1 Assumptions and Notations

In the code-generation algorithm, we assume the loop to be simdized is an innermost loop that satisfies the following conditions:

All memory references are either loop invariant or stride-one array references.

The base address of an array is naturally aligned to the data length of its array elements.

The loop counter can only appear in the address computation of stride-one references.

All memory references access data of the same length. There is no conversion between data of different lengths.

The rest of this description uses the following notations: V for the vector length, D for the uniform data length of all memory references in the loop, and $O_x$ for the stream offset of a graph node x. We also denote the blocking factor of the simdized loop as B, which is computed as the number of data per vector, i.e., $$B = V/D. \qquad (7)$$

5.2 Single-Statement Algorithm

The single-statement algorithm simdizes a single-statement loop where memory alignments and loop bounds are known at compile-time. We assume that the loop is normalized and has a loop counter i and an upper bound ub.

The input to the algorithm is the data reorganization graph of the single statement in the loop. The algorithm traverses the graph in post order starting from the store-node and recursively processes each child before itself. The code generation algorithm relies on native vector operations of the target machine plus an implementation of the generic data reordering operations presented in Section 4.2, namely, vsplat, vshiftpair, and vsplice. In addition, we use the following helper functions:

Runtime(c) determines whether c is a compile-time or run-time value.

Substitute(n,x←y) traverses the tree starting at node n and replaces all occurrences of x by y.

GenStorestmt(addr,expr,ptr) generates a store statement of expression expr to address addr at the insertion point specified by ptr. If addr is given as a string, e.g., 't', it represents the address of a local variable named 't'.

Simdizing an Expression

The following tasks are performed when processing nodes in the data reorganization graph of an expression, including all but the final store node in the graph. Store nodes are special cases that are presented in the next subsection. The detailed algorithm is given in FIG. 7.

VLOAD(addr(i)) When processing this node, we emit a vload vector operation of address addr(i)without further simdizing the load's inputs.

VOP($src_1$, . . . ,$src_n$) When processing this node, we first generate SIMD codes to compute every source value, which is then used by a SIMD version of the vop operation.

VSPLAT(x) When processing this node, we first generate traditional code to compute the x value, which is then used by a vsplat vector operation.

VSHIFTSTREAM(src,$O_{src}$,c) When processing this node, the algorithm first determines whether the register stream associated with src is shifted left (e.g., FIG. 4B) or shifted right (e.g., FIG. 4D).

When shifting a register stream left, i.e., $O_{src}$>c, data from the next register of the src register stream is shifted into the current register of the stream. Consider the VSHIFT-STREAM(b[i+1],4,0) in FIG. 4B. Data b[4] from the second register of the stream is shifted into the first register of the stream to produce (b[1],b[2],b[3],b[4]) as the first register of the out put register stream.

Since all memory streams are based on stride-one memory references, the next register in a register stream corresponds to the vector produced by the next simdized iteration. Thus, it can be computed by replacing i with (i+B) in the simdized node.

When shifting a stream right, i.e., $O_{src}$<c, the resulting vector register is similarly obtained by combining the previous and the current vector registers of the src register stream.

Simdizing a Statement

When simdizing a VSTORE(addr(i)), extra precaution must be taken for the first and last few iterations of the original loop. Consider, for example, the store a[i+3]= . . . originally illustrated in FIG. 4D. Since a[i+3] has an offset of 12 bytes, only 4 bytes of the newly computed data should be stored during the first iteration of the simdized loop. Similarly, only 12 bytes of the newly computed data should be stored in the last iteration of the simdized loop.

Figure 8:
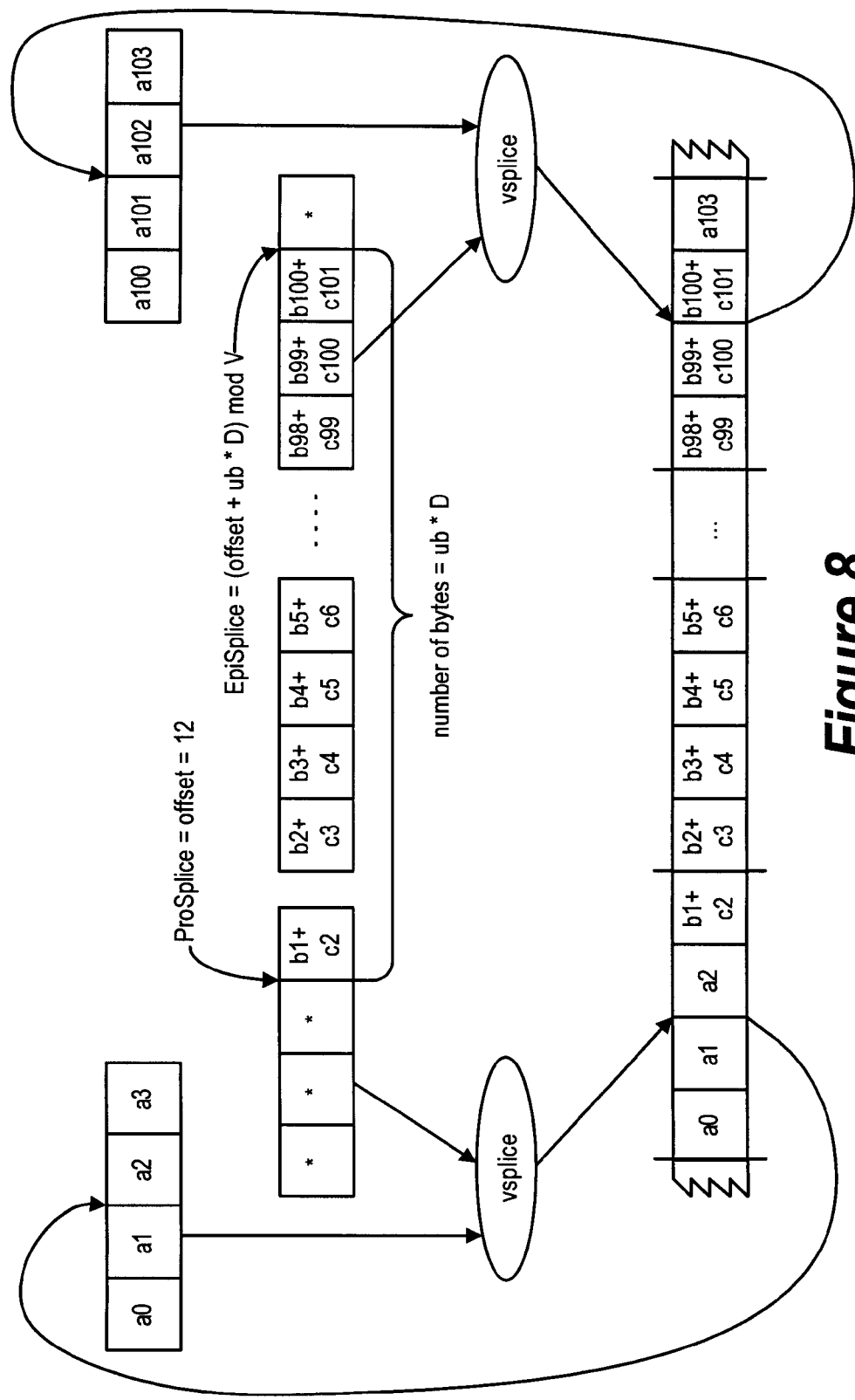
FIG. 8 is a diagram illustrating special case load, splice, and store operations for loop prologue and epilogue code in a simdized version of a loop generated in accordance with a preferred embodiment of the present invention.

In general, such partial vector stores can only occur in the first and/or the last iterations of a simdized loop. To handle such cases without impact on the steady state performance of a loop, we peel the first and the last iteration of a simdized loop into, respectively a prologue and epilogue that are customized to handle partial stores. As illustrated in FIG. 8, on SIMD units without dedicated hardware support, partial stores are implemented by loading the original value prior to the store, splicing it with the newly computed value, then storing the spliced value back into memory using vsplice operation. The algorithm to handle the prologue, steady-state, and epilogue is given in FIG. 9.

For the prologue, the newly computed values are spliced into the original value prior to the store from byte ProSplice to V−1. ProSplice is precisely the alignment associated with the store memory stream, i.e., $$\text{ProSplice} = \text{addr}(i=0) \mod V. \quad (8)$$

For the epilogue, the newly computed values are spliced into the original value prior to the store from byte 0 to EpiSplice−1, where EpiSplice corresponds to the offset of the first byte after the end of the store memory stream. Since the store memory stream is ubD bytes long, EpiSplice is computed as, $$\text{EpiSplice} = (\text{addr}(i=0) + ub\,D) \mod V \quad (9)$$

Simdizing a Loop

There is more to simdizing a single statement loop than generating codes for the prologue, steady-state, and epilogue. We must also specify the bounds and the step of the steady-state loop. These steps are detailed below.

The step of the steady-state loop is set to be the blocking factor B.

The lower bound of the steady-state loop is set to be the number of original loop iterations being peeled into the prologue, i.e., $$LB = \left\lceil \frac{V - \text{ProSplice}}{D} \right\rceil. \quad (10)$$

The upper bound of the steady-state loop is set to be the original upper bound minus the number of original loop iterations being peeled into the epilogue, i.e., $$UB = ub - \left\lfloor \frac{\text{EpiSplice}}{D} \right\rfloor. \quad (11)$$

5.3 Multiple-Statement Algorithm

Most handling in the SIMD code generation is performed on a per statement basis. Thus, the algorithm in Section 5.2 can naturally handle each statement of a multiple-statement loop. The only exceptions are the loop bound computations in Equations (10) and (11) which clearly need to be computed on a per loop basis. The bounds are thus refined below in the context of multiple-statement loops.

Since Equation (10) computes the lower bound using the alignment of the store, it is not applicable to loops with statements of distinct store alignments. The key observation to address this issue is that we do not need to compute the "precise" lower bound for each statement, as long as each memory operation loads and stores the right data. This is based on the assumption that the loop counter only appears in address computation. Recall that vector memory instructions implicitly truncate the address as they access only aligned data. For example, on VMX, loads from addresses 0×1000, 0×1001 or 0×100E each load the same 16 bytes of data starting at 0×1000.

Exploiting the truncation effect of address computation, we set the lower bound to be the blocking-factor, i.e., $$LB = B. \quad (12)$$

Equation (12) guarantees that the store associated with each statement in the first iteration of the steady-state loop corresponds to the first full vector store of its corresponding stream.

The upper bound specifies the highest iteration in the steady-state loop by which every store in the loop is guaranteed to be a full vector store. For an n-statement loop, we compute the upper bound of the steady-state loop by subtracting the largest EpiSplice over all statements from the original upper bound, i.e., $$UB = ub - \left\lfloor \frac{\max_{k=1\ldots n} \text{EpiSplice}_k}{D} \right\rfloor. \quad (13)$$

Furthermore, we need to compute the number of bytes that must be stored in the epilogue, referred to as EpiLeftover. This value is computed on a per statement basis as the total number of bytes in the memory stream, ubD, minus the number of bytes processed in the prologue, V−ProSplice, and the steady-state loop, r(UB−LB)/B⌉V combined. After simplification using (12), we have $$\text{EpiLeftOver} = ubD + \text{ProSplice} - \left\lceil \frac{UB}{B} \right\rceil V. \quad (14)$$

For some combinations of ProSplice and ub, EpiLeftOver can be greater than V but is necessarily smaller than 2V. The epilogue code generation thus has to generate a full vector store followed by a partial one with an epilogue splice point of (EpiLeftOver–V).

5.4 Runtime Alignments and Upper Bounds

The algorithm that handles VSHIFTSTREAM in FIG. 7 generates different code sequences depending on whether a stream is shifted left or right. For runtime alignments, we must introduce VSHIFTSTREAM in such a way that the shift direction can be determined at compile-time in spite of run-time alignments. The zero-shift policy exhibits this property as all misaligned loads are shifted left (to offset 0) and all misaligned stores are shifted right (from offset 0). Therefore we can still use the algorithm in FIG. 7 to handle runtime alignment as long as zero-shift policy is applied.

For the lower bound, we can safely use Equation (12) as it solely depends on the blocking factor.

However, we need to refine the upper bound formula (13) as $\max_{k=1 \ldots n} EpiSplice_k$ is expensive to compute at runtime. This can be achieved by finding a suitable upper bound to replace the max term. Recall the assumption that each array is naturally aligned to its data element length. Thus, addr(i) can be represented as mD for some integer m. Equation (9) then becomes (mD+ubD)modV and can be further simplified to ((m+ub)modB)D. According to the definition of mod, the largest value for EpiSplice is thus (B–1)D.

Replacing the max term in (13) by (B–1)D, we get this new upper bound:

$$UB = ub - B + 1. \quad (15)$$

Accordingly, (14) can be simplified to $$EpiLeftOver = ProSplice + (ub \bmod B)D. \quad (16)$$

Using (16), one can easily prove EpiLeftOver<2V.

Since the prologue always peels one simdized iteration and the epilogue stores at most 2 full vectors, i.e., two simdized iterations, the simdization is guaranteed to be valid if the original trip count is greater than 3B. When the trip count is unknown, the simdized codes must be guarded by a test of ub>3B.

5.5 Software Pipelined Algorithm

We can further improve the standard algorithm in Section 5.2 by eliminating the redundant computation introduced during stream shift handling. Recall that, in FIG. 9, GenSIMD-ShiftStream combines the values of two consecutive loop iterations, either the current and next iterations for left shifts or the current and previous iterations for right shifts.

For conciseness, we describe here and in FIG. 10 the values associated with the smaller iteration count as first and the one with the larger iteration count as second.

The key idea is to software pipeline the computation of the first and second values. Instead of computing both values associated with the first and second iterations in the loop, we only compute the values associated with the second iteration and preserve them to the next iteration, since this iteration's second values will become next iteration's first values.

As shown in FIG. 10, the software pipelined code generation scheme involves the following 3 steps.

1. We precompute first in a non software pipelined fashion (lines 12 and 15) using the standard algorithm GenSimdExpr. We then generate a statement to store the values of first to register old (line 17), inserted to the prologue of the loop.

2. We compute second in a software pipelined fashion (lines 13 and 16). And store second to register new (line 18). Since this expression is in the loop, we re cursively use software pipelined GenSimdExprSP.

3. We generate a statement to copy register new to register old (line 19) at the bottom of the loop.

Note that the steady-state loop involves only the computation of second (line 2) and the copy operation between new and old (line 19). In other words, we have replaced the computation of first in the steady-state loop by a copy operation. Note that the copy operation can be easily re moved by unrolling the loop twice and forward propagating the copy operation.

Figure 11:
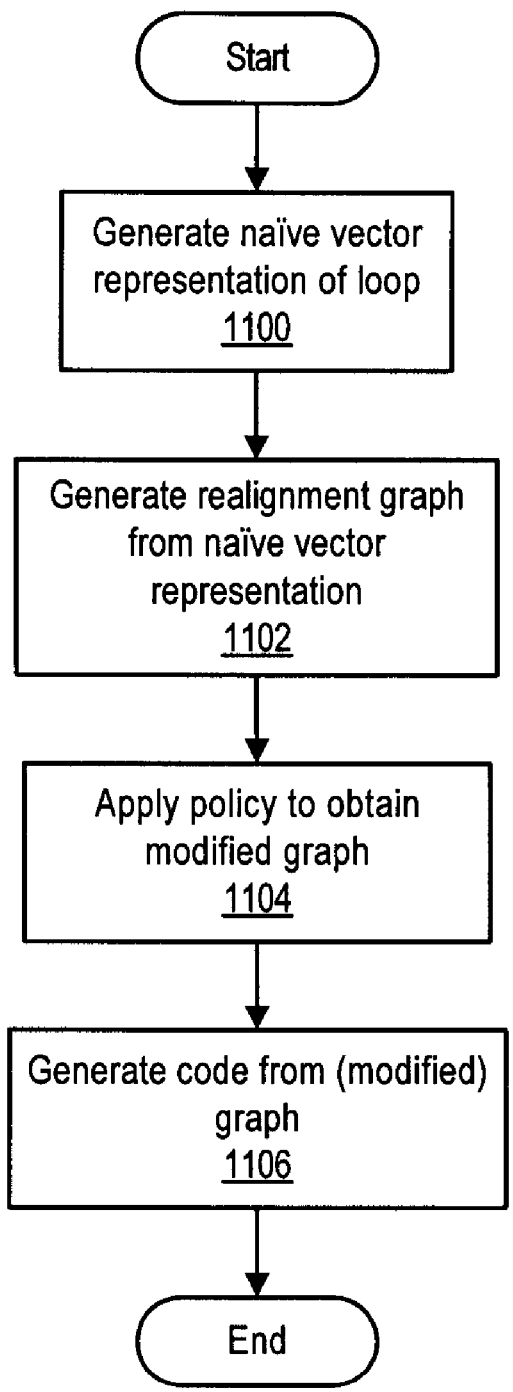
FIG. 11 is a flowchart representation of a process of vectorizing/simdizing a loop in accordance with a preferred embodiment of the present invention.

FIG. 11 is a flowchart representation of a process of simdizing a loop in accordance with a preferred embodiment of the present invention. First, a naive vectorized representation (e.g., FIG. 3A) of the loop is obtained without regard for the alignment or mis-alignment of the various memory streams involved (block 1100). Next, a realignment graph is generated from the naive vectorization by inserting shiftstream operations into the graph (block 1102). Next, a stream-shifting or alignment policy is applied to the graph so as to optimize the resulting code (block 1104). Finally, simdized code is generated from the optimized graph using an approach such as is described in Section 5 of this Detailed Description (block 1106).

Figure 12:
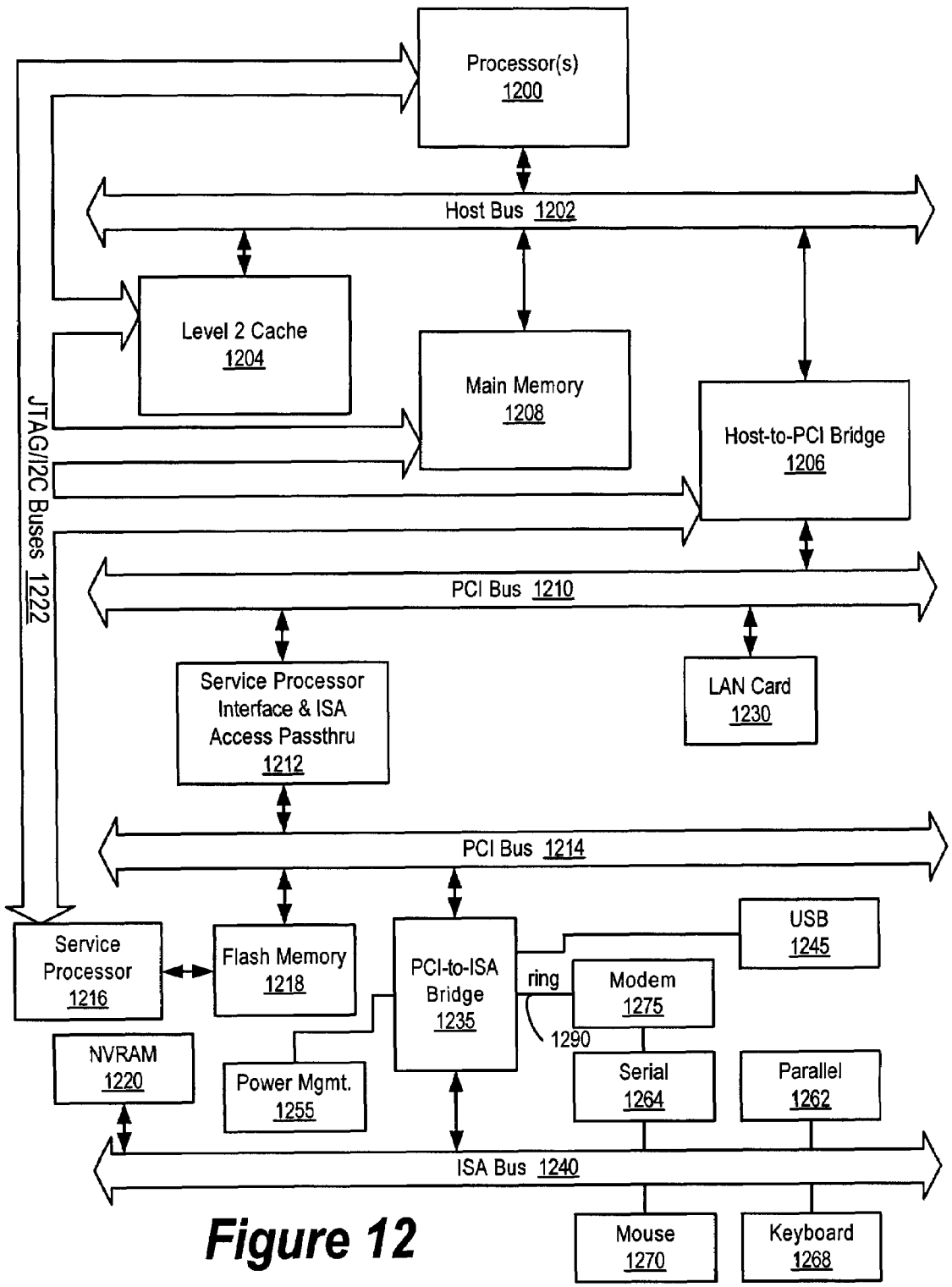
FIG. 12 is a block diagram of a computing device capable of implementing the present invention.

FIG. 12 illustrates information handling system 1201 which is a simplified example of a computer system capable of performing the computing operations described herein. Computer system 1201 includes processor 1200 which is coupled to host bus 1202. A level two (L2) cache memory 1204 is also coupled to host bus 1202. Host-to-PCI bridge 1206 is coupled to main memory 1208, includes cache memory and main memory control functions, and provides bus control to handle transfers among PCI bus 1210, processor 1200, L2 cache 1204, main memory 1208, and host bus 1202. Main memory 1208 is coupled to Host-to-PCI bridge 1206 as well as host bus 1202. Devices used solely by host processor(s) 1200, such as LAN card 1230, are coupled to PCI bus 1210. Service Processor Interface and ISA Access Pass-through 1212 provides an interface between PCI bus 1210 and PCI bus 1214. In this manner, PCI bus 1214 is insulated from PCI bus 1210. Devices, such as flash memory 1218, are coupled to PCI bus 1214. In one implementation, flash memory 1218 includes BIOS code that incorporates the necessary processor executable code for a variety of low-level system functions and system boot functions.

PCI bus 1214 provides an interface for a variety of devices that are shared by host processor(s) 1200 and Service Processor 1216 including, for example, flash memory 1218. PCI-to-ISA bridge 1235 provides bus control to handle transfers between PCI bus 1214 and ISA bus 1240, universal serial bus (USB) functionality 1245, power management functionality 1255, and can include other functional elements not shown, such as a real-time clock (RTC), DMA control, interrupt support, and system management bus support. Nonvolatile RAM 1220 is attached to ISA Bus 1240. Service Processor 1216 includes JTAG and I2C busses 1222 for communication with processor(s) 1200 during initialization steps. JTAG/I2C busses 1222 are also coupled to L2 cache 1204, Host-to-PCI bridge 1206, and main memory 1208 providing a communications path between the processor, the Service Processor, the L2 cache, the Host-to-PCI bridge, and the main memory. Service Processor 1216 also has access to system power resources for powering down information handling device 1201.

Peripheral devices and input/output (I/O) devices can be attached to various interfaces (e.g., parallel interface 1262, serial interface 1264, keyboard interface 1268, and mouse interface 1270 coupled to ISA bus 1240. Alternatively, many I/O devices can be accommodated by a super I/O controller (not shown) attached to ISA bus 1240.

In order to attach computer system 1201 to another computer system to copy files over a network, LAN card 1230 is coupled to PCI bus 1210. Similarly, to connect computer system 1201 to an ISP to connect to the Internet using a telephone line connection, modem 1275 is connected to serial port 1264 and PCI-to-ISA Bridge 1235.

While the computer system described in FIG. 12 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    generating a preliminary simdization of a loop, wherein the loop includes a first statement that has a first memory reference and a second statement that has a second memory reference, wherein the first memory reference and the second memory reference are aligned differently;
    peeling a first number of iterations corresponding to the first statement from the preliminary simdization of the loop;
    peeling a second number of iterations corresponding to the second statement from the preliminary simdization of the loop, wherein the first number of iterations is a different value than the second number of iterations;
    augmenting the peeled first number of iterations with vector-splicing instructions such that the peeled first number of iterations modifies only a subset of a vector associated with the first statement; and
    augmenting the peeled second number of iterations with the vector-splicing instructions such that the peeled second number of iterations modifies only a subset of a vector associated with the second statement.

2. The method of claim 1 wherein the peeled first number of iterations corresponding to the first statement includes at least one simdized iteration corresponding to a loop prologue and at least two simdized iterations corresponding to a loop epilogue.

3. The method of claim 2, wherein the preliminary simdization of the loop includes a steady-state simdized implementation of a loop body, the loop body including the first statement and the second statement.

4. The method of claim 3, wherein the peeled first number of iterations corresponding to the first statement includes one or more iterations of the steady-state simdized implementation of the loop body in addition to the vector-splicing instructions.

5. The method of claim 4, wherein the vector-splicing instructions for the first statement and the second statement cause only a subset of the at least one simdized iteration corresponding to the loop prologue to be modified, wherein the subset of the at least one simdized iteration corresponding to the loop prologue contains a number of bytes that is proportional to a difference between a hardware vector length and an alignment of a memory stream associated with the first statement and the second statement.

6. The method of claim 5, further comprising:
    setting a new lower bound for the steady-state simdized implementation of the loop body of the loop, wherein the new lower bound is equal to B; and
    setting a new upper bound for the steady-state simdized implementation of the loop body, wherein the new upper bound is calculated as a difference between an original upper bound for the loop and a maximum number of original loop iterations peeled in the loop epilogue.

7. The method of claim 5, wherein the vector-splicing instructions for the first statement and the second statement cause only a subset of the at least two simdized iterations corresponding to the loop epilogue to be modified, wherein the subset of the at least two simdized iterations corresponding to the loop epilogue contains a number of bytes that is proportional to a difference between a length of the memory stream associated with the first statement and the second statement inside the loop and a length of the subset of the at least one simdized iteration corresponding to the loop prologue.

8. The method of claim 1, wherein each of the at least one simdized iteration corresponds to original iterations of the loop and wherein is defined as a fraction in which the fraction's numerator is a hardware vector length and the fraction's denominator is a data item length.

* * * * *